United States Patent [19]

Audeh et al.

[11] 4,347,226

[45] * Aug. 31, 1982

[54] METHOD FOR TREATING SULFUR-CONTAINING EFFLUENTS RESULTING FROM PETROLEUM PROCESSING

[75] Inventors: Costandi A. Audeh, Princeton; Saverio G. Greco, Princeton Junction, both of N.J.

[73] Assignee: Mobil Oil Corporation, New York, N.Y.

[*] Notice: The portion of the term of this patent subsequent to Aug. 31, 1999, has been disclaimed.

[21] Appl. No.: 239,922

[22] Filed: Mar. 3, 1981

[51] Int. Cl.$^3$ .............................................. C01D 5/00
[52] U.S. Cl. .................................. 423/207; 423/210; 423/542; 423/551; 208/209; 208/234; 208/235; 210/737; 210/751; 210/761; 110/238; 110/346
[58] Field of Search .............. 423/210, 224, 179, 182, 423/183, 200, 206, 207, 522, 541, 542, 551; 208/132, 209, 230, 234, 235; 210/737, 751, 761; 110/238, 346

[56] References Cited

U.S. PATENT DOCUMENTS

| | | |
|---|---|---|
| 1,807,528 | 5/1931 | Hiatt ................................... 423/224 |
| 1,929,675 | 10/1933 | Chappell et al. ................ 423/210 C |
| 4,073,871 | 2/1978 | Optiz et al. ...................... 423/210 C |
| 4,154,607 | 5/1979 | Wikman et al. ................. 423/179 X |
| 4,237,103 | 12/1980 | Prible .................................... 423/207 |
| 4,270,468 | 6/1981 | Robinson et al. .............. 110/346 X |

FOREIGN PATENT DOCUMENTS 281273 12/1970 U.S.S.R. ............................. 423/551

OTHER PUBLICATIONS

Sales/Trade Brochure "John Zink Process Systems", 1980.

*Primary Examiner*—Earl C. Thomas
*Attorney, Agent, or Firm*—Charles A. Huggett; Michael G. Gilman; Charles J. Speciale

[57] ABSTRACT

The present invention is a method for disposal of noxious waste products generated in petroleum refining including spent caustic solution and concentrated sulfur effluent from treating of petroleum fractions to remove sulfur therefrom. Essentially the spent caustic solution and the concentrated sulfur effluent is incinerated in the presence of air in order to form the oxides of sulfur which react with the incinerated caustic to form alkali metal sulfides.

7 Claims, 1 Drawing Figure

METHOD FOR TREATING SULFUR-CONTAINING EFFLUENTS RESULTING FROM PETROLEUM PROCESSING

BACKGROUND OF THE INVENTION

The present invention pertains to petroleum processing and, specifically, to the art of disposal of effluents resulting therefrom.

Crude oils are exceedingly complex mixtures, consisting predominantly of hydrocarbons containing sulfur, nitrogen, oxygen, and metals as minor constituents. While it is desirable to recover the hydrocarbon constituents in their pure form, realistically it is very difficult to isolate pure products because most of the minor constituents occur in combination with carbon and hydrogen. Separation of impurities such as those listed above generally requires expenditures of valuable resources such as time, chemicals, energy, and money. Therefore, it is the constant goal of the petroleum processing industry to optimize impurity removal procedures, equipment and resources in order to eliminate those impurities which have the most degrading effect on the end products.

Perhaps the most ubiquitous impurity encountered in petroleum processing is sulfur. The presence of sulfur in petroleum products and, indeed, in the crude feedstock itself generally increases the corrosive characteristics thereof, and forms harmful and noxious reaction products upon combustion. In particular, the presence of sulfur-containing compounds reduces the combustion characteristics of gasoline and may render fuel oil unusuable in many places due to local regulations on the amount of sulfur allowed therein. Consequently, at nearly every stage of production measures are taken to either reduce the amount of sulfur or to render the sulfur-containing compounds inoffensive.

One method for removing sulfur-containing compounds—hydrogen treating of petroleum fractions—has been known since the 1930's. However, it was not until the advent of catalytic reforming, which made inexpensive hydrogenrich off gas available, that hydrogen desulfurization developed to commercial level. Presently, hydrogen desulfurization is primarily associated with a catalytic reaction using cobalt molybdate on an alumina carrier. The feedstock is mixed with recycle and make-up hydrogen and heated to 400°–850° F., then charged to a fixed bed reactor at 50–1500 psig.

Hydrogen treating is now used extensively to prepare reformer feedstock and to some extent for catalytic cracking feedstock preparations. It may also be used to upgrade middle distillates, cracked fractions, lube oils, gasolines, and waxes. Hydrodesulfurization, however, is a high energy-consuming process which also requires a supply of hydrogen.

Moreover, a major effluent resulting from hydrodesulfurization is hydrogen sulfide, $H_2S$,—a flammable poisonous gas. Even though hydrogen sulfide may simply be burned-off into the atmosphere, legislation in recent years has effectively limited this method of disposal because of the formation of sulfur dioxide which is intensely irritating to the eyes and respiratory system. Accordingly, alternate means for disposing of hydrogen sulfide have been developed and implemented.

The primary method of disposing of hydrogen sulfide is to convert the sulfur-bearing gas to elemental sulfur and water by, for instance, the Claus process. While this alternative may appear somewhat attractive since elemental sulfur is a saleable commodity, the Claus process requires construction of sulfur plants, expensive catalyst, and energy. Furthermore, the market for elemental sulfur is not so extensive as to be able to absorb all the elemental sulfur currently produced without depressing the price therefor. Finally, the Claus process itself is fraught with some difficulty in that approximately 3% of the reaction product is, again, the noxious sulfur dioxide which must be further treated by, for instance, a tail gas treating process, in order to reduce the level of $SO_2$ effluent to within the Environmental Protection Agency Standard of not more than 250 parts per million on a dry oxygen-free basis. Consequently, while the Claus process is still a viable alternative for disposing of hydrogen sulfide gas, it has become less attractive because of the cost of carrying out the process and because of the decrease in demand for the elemental sulfur.

Another method for treating petroleum to reduce the degrading effects of sulfur is chemical processing to "sweeten" sulfur compounds contained in the particular fractions, e.g., the mercaptans which are designated by the formula RSH. "Sweetening" denotes that mercaptan sulfur compounds are removed from a refinery stream, or else the mercaptans are converted to less objectionable disulfide compounds, e.g., R-S-S-R, R-S-S-R', etc. A particularly important process employed today is the sweetening of kerosine by the MEROX process to obtain jet fuel.

Whether sweetening is undertaken by solvent refining processes or by fixed bed adsorption, a caustic solution is generally first used to convert the mercaptan to the ionic state, $RS^-$, e.g., as in the cresylate process. Caustic solution is also helpful in that it removes naphthenic acids and other organic acids in general, and other sulfur compounds from cracked petroleum products and petroleum distillate. In fact, caustic treating of petroleum products has been used to improve odor and color nearly as long as the industry itself has been in existence. Numerous equipment modifications and processes have been designed to implement caustic treatment of process streams. Unfortunately, since caustic is quite harmful to organic tissue extreme care must be taken in the use and disposal of alkaline solutions such as sodium hydroxide solutions in order to protect the waterways, rivers, subterranean water formations, and, in many places, the oceans and surrounding seas of industrial areas from caustic pollution. This presents a significant problem to the industry because of the great volume of caustic used in petroleum processing and because all of the solutions used must eventually be discarded as a nonregenerative caustic or as the spent liquor resulting from a regenerative process.

To date the industry generally uses two methods to dispose of spent caustic—neutralization and incineration, incineration being a relatively new trend in waste alkaline liquor disposal. Incineration disposal presents certain advantages over neutralization disposal in that it is, first of all, environmentally cleaner since acid neutralization has a residual OOD (Organic Oxygen Demand) for the napthenic acids; while other advantages include such benefits as lower capital investment and less operating space required (i.e. ground area). Furthermore, incineration disposal is easier to operate. On the negative side, cost of operation of the incinerator units is high because of the energy required to maintain the elevated temperatures necessary to maintain combustion of the predominantly aqueous solution of alkaline waste. Commercial units presently in operation make use of the combustion of fuel oil, and natural gas to sustain the evaporation of the aqueous parts of the waste liquor and then furnish mostly carbon dioxide, $CO_2$, to form the innocuous carbonates of sodium or other alkali metals for disposal. Refined fuel oil and natural gas are very expensive means for disposing of the volumes of caustic discarded as a result of petroleum processing and they are both very valuable commodities in terms of consumer-useable energy sources.

In a co-pending application Ser. No. 238,309, filed Feb. 26, 1981 by the same inventors, a method is disclosed whereby the great volume of alkaline waste liquor which results from petroleum processing, can be safely disposed of by expending reduced amounts of commercially-useable and expensive fuel supplies; and whereby innocuous sulfates are produced from potentially harmful and/or noxious sulfur-containing fuels. The disclosure of the above-referenced co-pending application does not, however, solve the problem of production of excess sulfur containing effluents, nor the problem of insufficient sulfur in the particular fuel to neutralize all the caustic produced at a particular processing plant. It is, therefore, the object of the present invention to resolve both of these problems utilizing processing effluents which are otherwise unuseable or undesirable.

SUMMARY OF THE INVENTION

By the present invention it is proposed to provide a method for disposal of noxious waste products generated in petroleum refining including spent caustic solution and concentrated sulfur effluent from treating of petroleum fractions to remove sulfur therefrom. This method comprises incinerating the spent caustic and the concentrated sulfur effluent together in the presence of air in order to form the oxides of sulfur which, in turn, react with the incinerated caustic to form alkali metal sulfates.

Generally, the sulfur-containing compounds are either disulfides and/or mercaptans, which may be generated in sweetening processes and/or caustic regenerative processes. If the direct gaseous effluents (air or steam plus mercaptans) generated in the regenerative caustic processes is used as a source of sulfur, a source of air pollution is eliminated and the heat contained in those effluents is further used to aid in the incineration process.

Furthermore, the present process eliminates a part of the load on the hydrodesulfurization equipment with a concomitant availability of HDS capacity and a reduced sulfur make.

For a better understanding of the present invention, together with other and further objects, reference is made to the following description taken in conjunction with the accompanying drawings, and its scope will be pointed out in the appended claims.

DETAILED DESCRIPTION OF THE INVENTION

Figure 1:
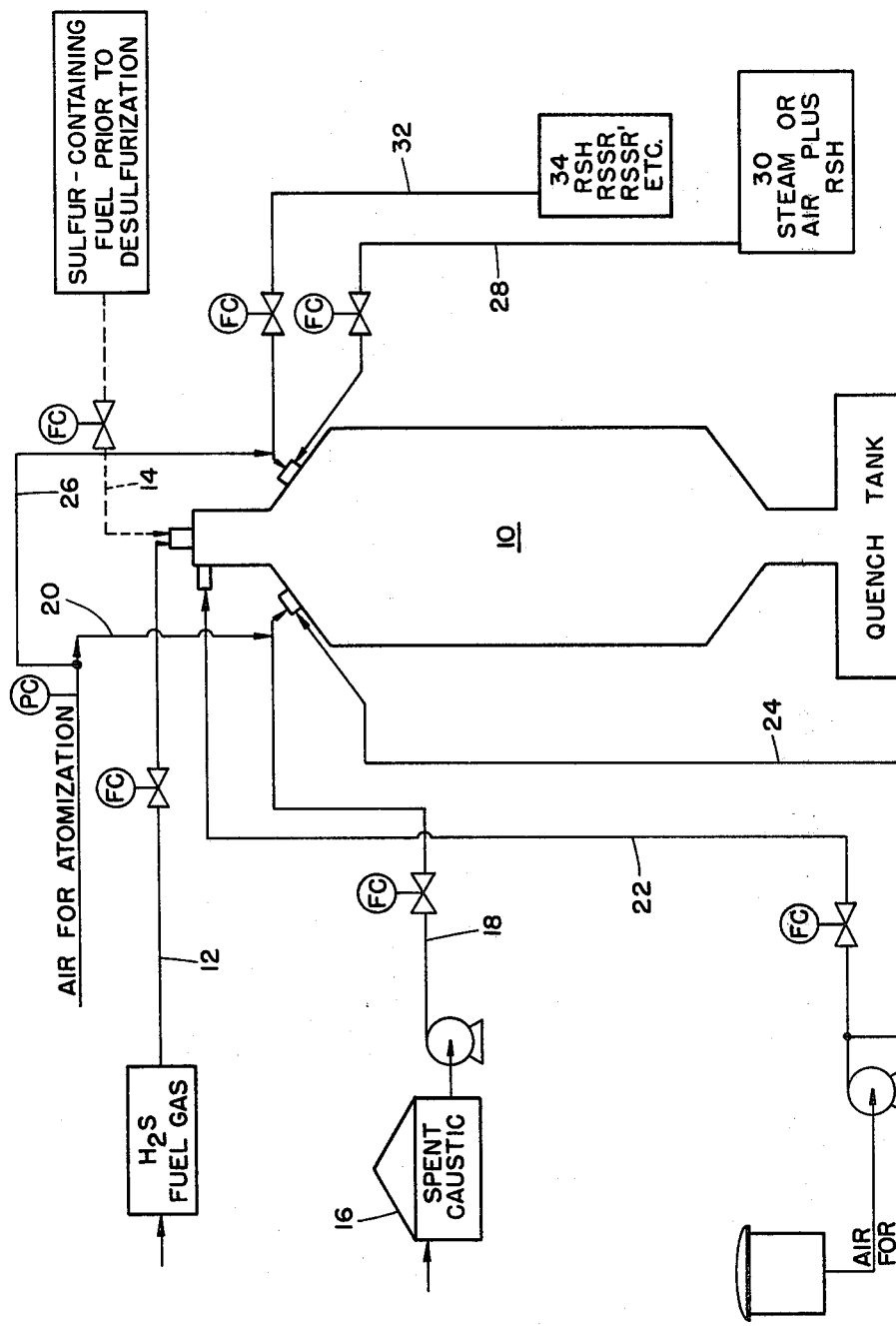
FIG. 1 is a schematic of the process of the present invention.

The process of the present invention is predicated primarily on the fact that disulfides and mercaptans are easily incinerated and supply sulfur according to equations 1 and 2 below wherein the product of combustion of the hydrocarbon fragments are the usual $CO_2$ and $H_2O$ shown unbalanced:

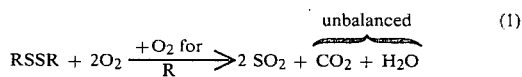

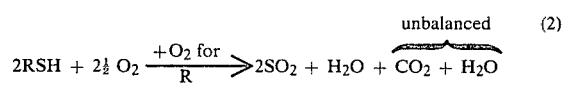

The sulfur dioxide, however, is available for further reaction with an alkaline material, such as NaOH, to produce harmless $Na_2SO_4$.

This fact can be used, therefore, to augment the sulfur-containing fuel in the sulfate producing incineration process such as disclosed in the above-referenced co-pending application, or can be used as the sole source of sulfur in an alkaline incineration process that utilizes a non-sulfurous fuel, e.g., $CH_4$, $C_2H_6$, $C_2H_4$, etc. In the disclosure of the co-pending application a process is shown wherein a sulfur-containing fuel is used to combust petroleum processing alkaline waste liquor thereby forming innocuous sulfates. Where, however, there is an overabundance of alkaline waste, or where there is produced an overabundant quantity of sulfur-containing compounds that would be more economically disposed of than processed, or, for any of the many other cogent reasons, a need exists to supply a sulfur-containing compound to react with alkaline waste product, an independent stream containing a known amount of sulfur can be provided according to the present invention to neutralize the alkaline waste liquor.

Referring to the drawing, the above-described process takes place in a refractory incinerating column 10, into which the different components are fed by means of metered flow stream lines as described herein.

In a preferred embodiment of the invention, the fuel used to support the combustion reaction is hydrogen sulfide gas, $H_2S$, which may be derived from hydrodesulfurization processes. This form of the process is especially attractive since the combustion of gas is easier than the combustion of a liquid sulfur-containing fuel, such as fuel oil. In the drawing, hydrogen sulfide fuel input is designated by feed line 12 which supplies the fuel to the top portion of the column. Additionally, a fuel supply line, shown as phantom feed line 14, may be installed to provide an alternate supply of sulfur-containing fuel to be used in addition to or in lieu of the previously indicated source. If the alternate supply of sulfur-containing fuel is in a physical state different than the physical state of the primary source, e.g. liquid fuel oil vs. gaseous hydrogen sulfide, then a separate metering device should be used on the additional fuel supply line as is depicted herein, in order to facilitate maintenance of the correct stoichiometric amount of sulfur to sustain the described reactions.

Another reaction product and usually the most important waste product that must be disposed of is the alkaline waste liquor. Preferably, this waste liquor is first collected in a repository 16 from the various sources in the petroleum processing system wherein spent caustic is generated. The alkaline solution, which is predominantly aqueous in nature, is then pumped to the incinerator unit over alkaline supply line 18 into which pressurized air is injected via air feed line 20 prior to introduction into the incineration chamber.

Pressurized air is needed to atomize the aqueous alkaline solution so that the aqueous content is easily vaporized and the alkaline material is finely dispersed to facilitate rapid reaction.

When, however, it is desired for whatever reason to introduce a sulfur-containing effluent to the incineration process in order to produce the harmless alkaline sulfates, an additional reservoir 34 should be provided to collect the sulfur-containing solutions which may then be injected into the combustion chamber via metered supply line 32 into which pressurized air is fed just prior to its entrance into the refractory column 10. Specifically, the stream of disulfides which result from the extractive removal of mercaptans by the cresylate process may be used, as well as the naphtha wash streams used to remove the final traces of disulfides from the cresylate process.

As for mercaptans which are produced by regenerative caustic processes, a separate feed line 28 may be provided directly from the outlet for gaseous effluents, generally designated by collector 30, resulting from such regeneration processes. Two such effluents which are imminently eligible are: (1) the steam/mercaptan effluent generated in the hydrolytic stripping of mercaptans from caustic, i.e.

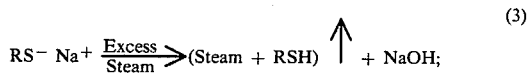

$$RS^- Na^+ \xrightarrow{\text{Excess Steam}} (Steam + RSH) \uparrow + NaOH; \quad (3)$$

and (2) the air effluent produced as a result of the oxidation of mercaptans in the turboxidizer of the regenerative caustic process shown in equation 4;

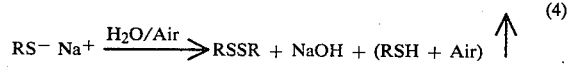

$$RS^- Na^+ \xrightarrow{H_2O/Air} RSSR + NaOH + (RSH + Air) \uparrow \quad (4)$$

By introducing these two gaseous effluents into an incinerator, no additional pressurized air need be added for atomization. Moreover, the heat content necessarily contained in these effluents adds to the overall heat of the oxidation process occurring in the column 10, and further sources of air pollution are eliminated.

The final reaction component that must be provided for the conversion of caustic and sulfur-containing effluents to innocuous sulfates is oxygen. Besides the oxygen which is provided to atomize the caustic or to atomize a liquid fuel if, for instance, fuel oil is used as a fuel, oxygen should also be provided by, for example, a separate air supply line 22 in a sufficient quantity to insure total combustion of the alkaline material in the spent waste liquor as well as any organic compounds that may be found in the waste liquor or sulfur-containing effluent. Additional air may be provided via subsidiary air supply line 24 to the input of the caustic solution to insure that the solution is adequately dispersed for complete burning.

Once the combined fuel, oxygen, sulfur-containing effluent and caustic is ignited, continual combustion is sustained by the heat of the described reaction and normal rapid oxidation of the components found in the caustic/fuel/sulfur effluent mixture. Combustion of organic compounds present in the waste liquors and sulfur effluents, as well as the heat contained in the regenerative process effluents aid in the heat balance of the incinerator.

Furthermore, every mole of hydrogen sulfide that may be combusted supplies one mole of $H_2$ for the generation of $H_2O$, in addition to the $H_2O$ generated by oxidation of the R component of the mercaptan and/or disulfide, which is needed in the maintenance of the mass and heat balances of the incinerator.

To be sure certain advantages accrue to the process wherein the gaseous $H_2S$ is used as the fuel. Control of the fuel to air to waste liquor ratio of a gaseous fuel is easier than controlling that of a heavier viscous fuel oil, especially if changes in the alkali metal ions content is anticipated. Furthermore, $H_2S$ contains 94% sulfur and thus furnishes a constant sulfur content for smooth operation.

However, it is still within the scope of the present invention to include the use of sulfur-containing fuel oil as an auxiliary fuel to support continual conversion reaction. This option becomes particularly attractive when the crude stock is exceptionally sour (i.e. high in sulfur content) thereby requiring extensive hydrodesulfurization to obtain a fuel oil which is saleable in those parts of the country that require the use of a relatively sulfur-free fuel oil for industrial and domestic heating. Hydrodesulfurization, however, is an energy intensive process that requires a constant supply of hydrogen. Instead of processing the fuel oil fraction to the extent required to eliminate nearly all the sulfur-containing compounds found therein, it may well be discovered upon cost analysis that a savings would be realized by burning the high-sulfur-content fuel oil in the process described by the present invention to render the caustic effluents harmless.

Regardless of the fuel, the principle of the present invention remains the provision of a sulfur-containing effluent for complete conversion of an alkaline solution to a harmless sulfate, and, while a particular arrangement of apparatus is schematically shown herein as a system for implementing this process, the inventors do not concede this to be in any way a limiting depiction of the myriad of arrangements which could be used to perform the novel process.

While there have been described what are believed to be the preferred embodiments of the invention, those skilled in the art will realize that changes and modifications may be made thereto without departing from the spirit of the invention, and it is intended to claim all such changes and modifications as fall within the true scope of the invention.

I claim:

1. A process for disposal of noxious waste products generated in petroleum refining including spent caustic solution and concentrated sulfur effluent from treating of petroleum fractions to remove sulfur therefrom comprising incinerating said spent caustic solution and said concentrated sulfur effluent together in the presence of air so that the sulfur contained in said concentrated sulfur effluent is converted to the oxides of sulfur which react with the incinerated caustic to form alkali metal sulfates.

2. A method as in claim 1 wherein hydrogen sulfide, $H_2S$, is provided as a primary fuel to support said incineration.

3. A method as in claim 1 wherein sulfur containing fuel oil is provided as a primary source of fuel to support said incineration.

4. A method as in claim 1 wherein the sulfur contained in said concentrated sulfur effluent comprises mercaptans and disulfides.

5. A method as in claim 1 wherein said effluent comprises a steam and mercaptan stream generated in the hydrolytic stripping of mercaptans in the regenerative caustic treating process.

6. A method as in claim 1 wherein said effluent comprises an air and mercaptan stream generated by the oxidation of mercaptans in the turboxidizer of a regenerating caustic process.

7. A method as in claim 2 wherein said hydrogen sulfide is derived from hydrodesulfurization processes.

* * * * *